Nov. 6, 1928.  1,690,765
U. ANTONI
CONSTRUCTION OF FLEXIBLE AEROPLANE WINGS WITH VARIABLE PROFILE
Filed Dec. 23, 1926  2 Sheets-Sheet 1

U. Antoni
INVENTOR

By: Marks & Clark
Attys.

Nov. 6, 1928. 1,690,765
U. ANTONI
CONSTRUCTION OF FLEXIBLE AEROPLANE WINGS WITH VARIABLE PROFILE
Filed Dec. 23, 1926 2 Sheets-Sheet 2
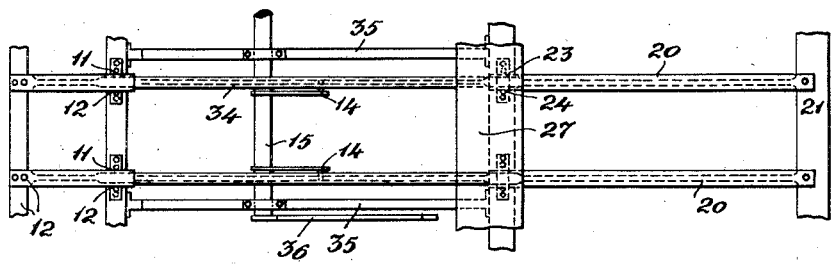
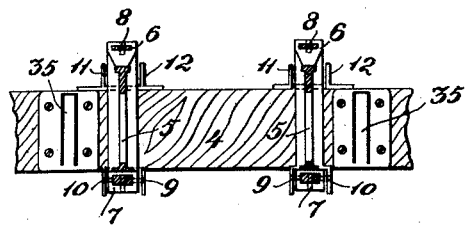
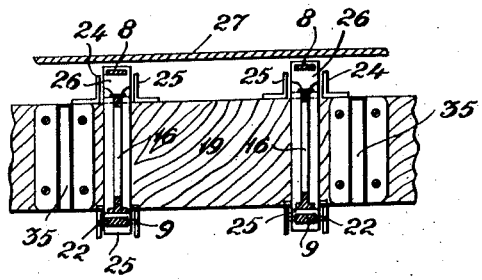

Patented Nov. 6, 1928.

1,690,765

UNITED STATES PATENT OFFICE.

UGO ANTONI, OF VIAREGGIO, ITALY.

CONSTRUCTION OF FLEXIBLE AEROPLANE WINGS WITH VARIABLE PROFILE.

Application filed December 23, 1926, Serial No. 156 741, and in Italy April 23, 1926

Means are already known for varying the profile of aeroplane wings with the object of obtaining a quick change of speed and a variation of the carrying capacity of a wing at the will of the pilot.

The improvements object of the present invention relate on the contrary to the proper construction of the wing substantially consisting of two parts, one with a variable profile controlled by the pilot, the other automatically flexible.

The automatically flexible part consists of a various number of deformable members arranged towards the fuselage, conveniently tapering and proportionately less flexible towards the front edge, with only one lever controlled by the pilot, the prolongation of said lever forming the front edge just mentioned.

In correspondence of the tail edge on the contrary the upper part of the internal frame of the deformable member is attached by pivot to the corresponding spar.

The part with variable profile is also formed by a variable number of deformable members having two levers fulcrumed below to the spars. The lever towards the front edge and the lever of the deformable members of the flexible part are perfectly equal. The lever of the back end forms by its projection the armature of the deformable member.

In correspondence to the through bores of the spars the levers are provided with recesses above and below to receive the end of flexible strips fixed in said recesses with one end towards the front edge, the strips being able to slide, in the corresponding recesses, within the back levers, this arrangement being provided for the part with variable profile.

As to the automatically flexible part the strips, fixed as above said, are prolonged to the back end of the wing and connected to each other at this end by independent triangular armatures, these armatures being on one side rigidly joined to the strips, their bases on the contrary abutting against each other.

The two armatures are connected by any elastic means whatever, which, while allowing them to go away from one another during the flexure of the strips prevent flexure from taking place in a contrary direction.

Said strips are guided by convenient sleeves of different height in which they slide, these sleeves keeping constant the thickness, that is the profile of the wing. The levers mentioned are united by connecting rods to a driving axle.

The invention is illustrated in the accompanying drawings in which:

Fig. 4 is a plan view of Fig. 3 while Figs. 5 and 6 show sections on lines a—a and b—b of Fig. 3 illustrating the recesses on the corresponding levers and strips.

Figure 3:
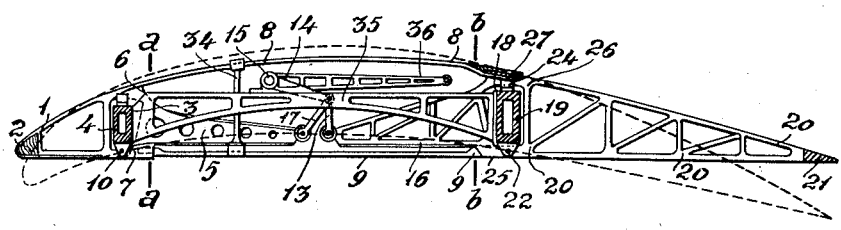
Fig. 3 is a cross section of a deformable member of the part with variable profile controlled by the pilot.

The fore part of the deformable members of the part with variable profile (Figs. 3 and 4) is formed by fastenings 1 fixed to the edge 2, the hole 3 for the passage of the spar 4, the internal prolongation or armature forming the lever arm 5 and the parts 6 and 7 in which the recesses for the strips' ends 8 and 9 are provided.

Said part is rotatably connected below to the spar 4 by pivots 10 while above it slides between the guides 11 and 12 rigidly joined to the upper part of said spar. The end of lever 5 is united by the connecting rod 13 to the arm 14 rigidly united to the driving axle 15.

The back part of said deformable member is formed by the lever 16 united by connecting rod 17 to arm 14, the hole 18 for the passage of spar 19 and prolongation 20 forming the back armature of the wing, this prolongation being connected with the tail edge 21.

Said part is also pivotally connected by pivots 22 below the spar 19 while above it is slidable between the guides 23 and 24 rigidly united to said spar.

The recesses 25 and 26 receive slidably in their interior the back ends of strips 8 and 9. A convenient cover 27 rigidly united to said ends keeps unvaried when the strips are sliding, the line of the stern profile of the wing by means of armature 20. On said cover the canvas of the fore part is fixed while the canvas of the back part is fixed independently below said cover.

The deformable members of the automatically flexible part (Fig. 2) in the front part are exactly equal to the deformable members mentioned controlled by the pilot, while in the back the armature or lever 20¹ is attached above pivotally in 28 on the back of spar 19 and abuts against the same spar so that when flight is capsized the flexture of the strips may be prevented, while the flexture of the strips on high in the planing flights is allowed, the gravity being then transformed in driving force. On said spar 19 on the upper and bottom side the sleeve shaped guides 29 and 30 are fixed where the strips may freely slide.

In the tail edge the strips are connected together respectively by triangular shaped armatures 31—32. The armature 31 is fixed on one side to strip 8, while armature 32 is fixed to strip 9. The two armatures are independent and abut against each other in their bases, an elastic member 33 connecting and pulling them to their place.

Convenient sleeves 34 fixed to the levers and armatures besides keeping unvaried the profile of the wing serve as a guide for the sliding of the strips 8 and 9 in their flexure. A determined number of ties or bridges 35 rigidly connected to the spars 4 and 19 keep the solidity of the wing's structure, the driving axle 15 operated by the pilot by means of lever 36 being fixed on the ties.

Figure 1:
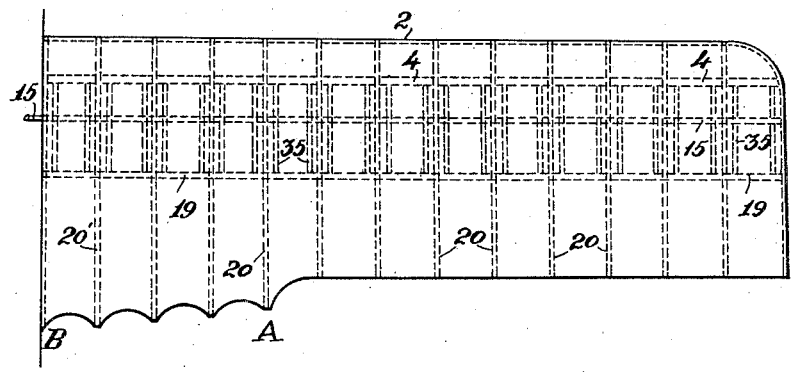
Fig. 1 shows a plan view of a wing according to the improvements object of the invention.

According to above description the deformable members of the automatically flexible part being more flexible from A towards B the wing will be flexed obliquely with respect to the axis of the apparatus, consequently also the components m will have the same divergence to detriment of the speed but with the result of an automatic equilibrium of the wing surface when constructed as above mentioned and illustrated in Fig. 1.

Owing to the divergent components the deformable members A and B besides an initial flexure on high are subjected to a permanent deformation downwards towards the axis of the fuselage, the flexure of the strips taking place according to their own cross section.

Figure 2:
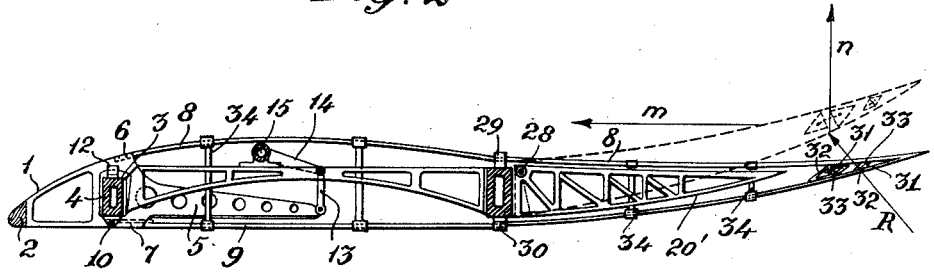
Fig. 2 is a cross section of a deformable member of the automatically flexible part.

If we take a point whatever of the back part of the deformable member illustrated in Fig. 2 when under the action of the gravity during planing flights the resistance of the air is exercised on the bottom surface of the wing, said resistance will clearly act in the sense of the arrow R and will be decomposed into the components m and n. The component n is opposed to the gravity and m is a driving force in the direction of the flight.

Having now particularly described and ascertained the nature of my said invention and in what manner the same is to be performed I declare that what I claim is:

1. A wing for flying machines having a variable profile, comprising a pair of spacedly arranged spars, a plurality of bridges rigidly connected to said spars, a plurality of levers having apertures for the passage of the spars pivotally connected to the underneath side of the front spar, guide members disposed on said front spar and adapted to guide said levers upon their movement, said levers being provided on their upper sides with recesses adapted to receive flexible strips forming the profile of the wing, a plurality of back levers pivotally connected to the rear spar opposite said front levers, and having apertures for the passage of the spar, guides on said spar adapted to guide said levers upon movement thereof, said levers having recesses in their upper sides for the passage of the flexible strips forming the wing, a plurality of sleeve members fixedly mounted on said levers for guiding the flexible strip and having a height proportioned to the profile of the wing, and control means associated with said levers whereby the profile of the wings is controlled by the pilot.

2. A two part flexible flying machine wing having a variable profile, comprising one part having its profile controlled by the pilot, a second part being automatically flexible, said wing being arranged on a pair of spacedly arranged spars rigidly secured to a plurality of bridges, said part of the wing controlled by the pilot comprising a plurality of levers pivotally connected to the front spar and having apertures for the passage of the spar, said levers being provided on their upper sides with recesses adapted to receive and secure flexible strips forming the profile of the wing, a plurality of back levers pivotally connected to the rear spar opposite said front levers having apertures for the passages of the spar, said ever having recesses in their upper parts slidably engaging the flexible strips forming the wing, a plurality of sleeve members fixedly mounted in spaced relation on said levers for guiding the flexible strips and having a height proportional to the profile of the wing, and control means associated with said levers whereby the profile of the wing is controlled by the pilot.

3. A wing for flying machines as claimed in claim 2, having guide members disposed on the upper part of said spars for guiding said levers upon their movement thereof.

4. A two-part flexible flying machine wing having a variable profile, comprising one part having its profile controlled by the pilot, a second part being automatically flexible, said wing being arranged on a pair of spacedly arranged spars rigidly secured to a plurality of bridges, said part of the wing controlled by the pilot comprising a plurality of levers pivotally connected to the front spar and having apertures for the passage of the spar, said levers being provided on their upper sides with recesses adapted to receive and secure flexible strips forming the profile of the wing, a plurality of back levers pivotally connected to the rear spar opposite said front levers having apertures for the passage of the spar, said lever having recesses in their upper parts slidably engaging the flexible strips forming the wing, a plurality of sleeve members fixedly mounted in spaced relation on said levers for guiding the flexible strips and having a height proportional to the profile of the wing, control means associated with said levers whereby the profile of the wing is controlled by the pilot, said second automatically flexible part comprising a plurality of triangular shaped back levers pivotally fulcrumed to the rear spar and extending backward from said fore part of the wing, a plurality of spacedly arranged sleeves having a height proportional to the profile of the wing fixedly mounted on said lever, a plurality of guides on the upper and lower part of the rear spar arranged to guide the flexible strip, which is held by the spacedly arranged sleeves, triangular shaped armatures connecting the tail edges of the strips together, and elastic means for holding the triangular armatures in their normal position.

In testimony whereof I have hereunto signed my name.

UGO ANTONI.